(12) United States Patent
Cooper et al.

(10) Patent No.: US 6,892,246 B2
(45) Date of Patent: May 10, 2005

(54) COMPUTER SYSTEM AND METHOD FOR STORING VIDEO DATA

(76) Inventors: Alan N. Cooper, 4444 Westgrove, Addison, TX (US) 75001; David W. Bauerle, 833 Old Justin Rd., Argyle, TX (US) 76226

( * ) Notice: Subject to any disclaimer, the term of this patent is extended or adjusted under 35 U.S.C. 154(b) by 730 days.

(21) Appl. No.: 09/880,063

(22) Filed: Jun. 13, 2001

(65) Prior Publication Data

US 2002/0194253 A1 Dec. 19, 2002

(51) Int. Cl.[7] .............................. G06F 15/16; H03M 7/30
(52) U.S. Cl. ........................ 709/247; 380/217; 380/269; 704/500; 704/503
(58) Field of Search .......................... 709/247; 380/217, 380/269; 704/500, 503

(56) References Cited

U.S. PATENT DOCUMENTS

| | | | |
|---|---|---|---|
| 4,337,458 A | 6/1982 | Cohn et al. | |
| 5,184,124 A | 2/1993 | Molpus et al. | |
| 5,600,316 A | 2/1997 | Moll | |
| 5,659,787 A | 8/1997 | Schieltz | |
| 5,770,533 A | 6/1998 | Franchi | |
| 5,801,625 A | 9/1998 | Wang | |
| 5,802,522 A | 9/1998 | Lloyd et al. | |
| 5,818,877 A | 10/1998 | Tsai et al. | |
| 5,884,042 A | 3/1999 | Winter et al. | |
| 5,886,894 A | 3/1999 | Rakoff | |
| 5,909,548 A | 6/1999 | Klein et al. | |
| 5,929,794 A | 7/1999 | Hayakawa et al. | |
| 5,977,889 A | 11/1999 | Cohen | |
| 5,995,916 A | 11/1999 | Nixon et al. | |
| 6,002,995 A | 12/1999 | Suzuki et al. | |
| 6,266,753 B1 * | 7/2001 | Hicok et al. ................. | 711/202 |
| 6,370,631 B1 * | 4/2002 | Dye ............................ | 711/170 |
| 6,779,040 B1 * | 8/2004 | Lee et al. .................... | 709/247 |
| 2001/0035976 A1 * | 11/2001 | Poon ........................... | 358/1.15 |

* cited by examiner

*Primary Examiner*—Krisna Lim
(74) *Attorney, Agent, or Firm*—Schultz & Associates, P.C.

(57) ABSTRACT

A computer system and method for storing video data in memory is disclosed. Memory capacity is evaluated. If the memory capacity is sufficient to allow the storing of video data in the mass storage device, then the video data is stored. If the memory capacity available is insufficient to storage the video data and the mass storage device, the oldest stored video data in the mass storage device is identified. The oldest stored video data is then removed from the mass storage device and stored in memory. The video data in memory is then modified to require less space in memory. The new video data and the modified video data are then written to the mass storage device.

15 Claims, 8 Drawing Sheets

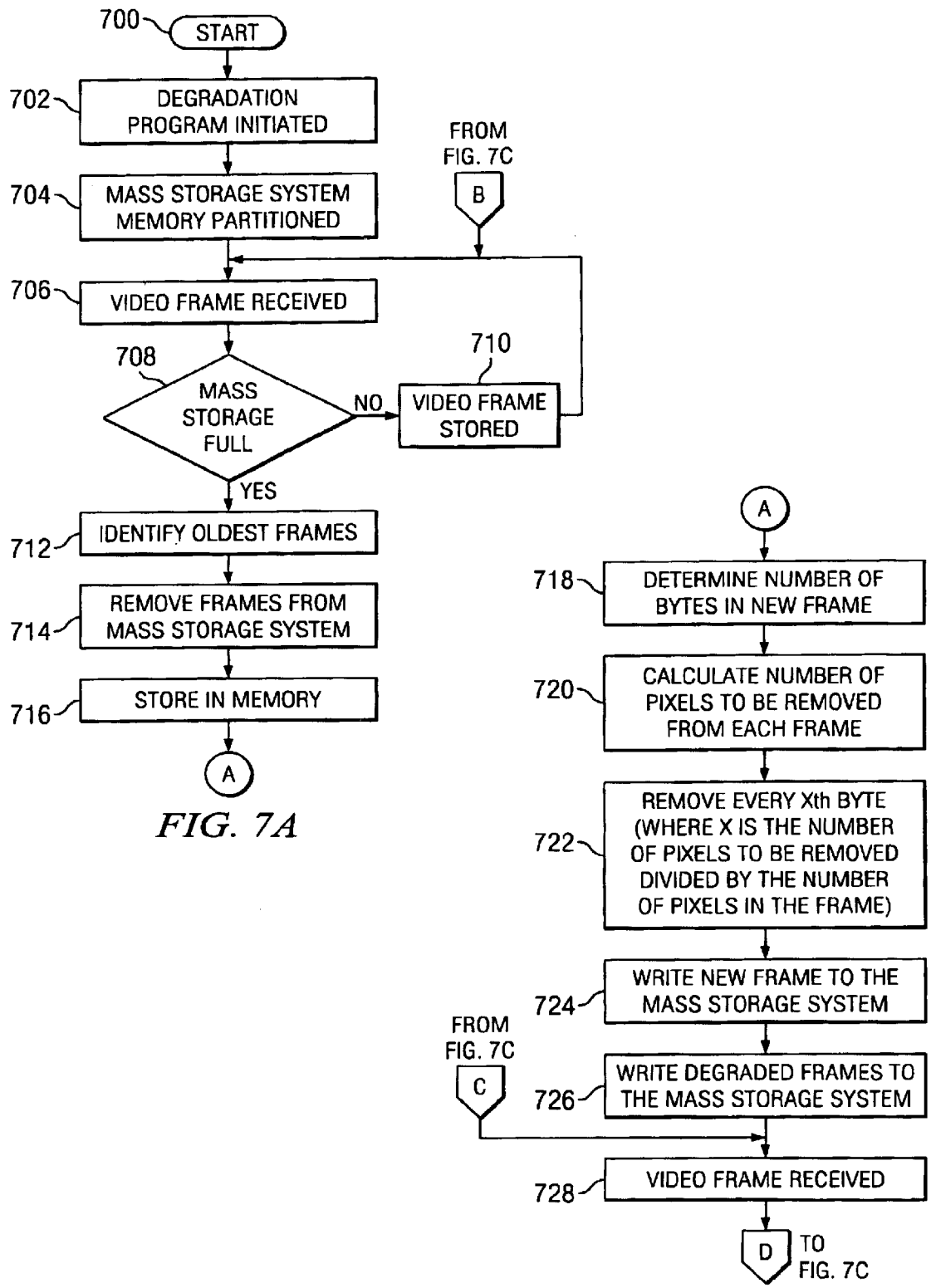

COMPUTER SYSTEM AND METHOD FOR STORING VIDEO DATA

CROSS-REFERENCE TO RELATED APPLICATIONS

Not Applicable.

STATEMENT REGARDING FEDERALLY SPONSORED RESEARCH OR DEVELOPMENT

Not Applicable

FIELD OF THE INVENTION

The field of the invention relates to the storing of video data. More particularly, the invention relates to a method for storing video data in a mass storage device where once the mass storage device has reached its capacity, the oldest video data is degraded by removing random pixels from the video frame.

BACKGROUND

For many years, software developers and users have attempted to develop processes to store data in the least amount of space required in a mass storage device. To reduce the amount of memory required in a mass storage device, compression techniques have been developed. Compression of data has become increasingly important as computer systems are now used to store vast amount of video data. Video data, which is generally sent in frames, requires a vast amount of storage capacity. Examples of video memory data compression advancements are provided in U.S. Pat. No. '1 5,184,124 issued to Molpus et al., U.S. Pat. No. 5,929,794 issued to Hayakawa et al. and U.S. Pat. No. 5,884,042 issued to Winter et al. U.S. Pat. No. 5,194,124, entitled Method and Apparatus for Compressing and Storing Pixels, discloses a method and apparatus in which 32 bit pixels (8 bits each of red, green, blue and alpha) are converted to or from 16 bit pixels (4 bits each of red, green, blue and alpha), using an ordered dithering technique. The ordered dithering technique spatially distributes the information that would otherwise be lost by truncation. This is accomplished by replacing exact pixel values with their pseudo-random average. In U.S. Pat. No. 5,929,794, entitled Digital Information Data Recording and Reproduction Apparatus, an apparatus is disclosed that subjects an initially compressed video data to a framing process which uses a fixed link format. Ineffective data is removed from the framing data of the fixed length format during the framing process and this modified data is then recorded to the mass storage device. In U.S. Pat. No. 5,884,042, entitled Data Identification in an Intelligent Video Information Management System, an apparatus which processes video data through an image analysis algorithm is disclosed. The outcome of the image analysis is then recorded on the mass storage media.

Multiple compression techniques are available however, any advancement in the ability to reproduce video data more accurately after it is stored in a mass storage device would be advantageous.

SUMMARY OF THE INVENTION

A computer system and method for storing video data is disclosed which allows the video data to be stored in the mass storage device without standard compression techniques and still allows for efficient use of the mass storage devices capacity. The capacity of the mass storage device is determined. While there remains capacity in the mass storage device, video data is stored directly in the mass storage device. Once the mass storage device has reached its capacity, the oldest video data is identified. That video data is then removed from the mass storage device and written into memory. While in memory, various pixels are removed from each frame such that when the degraded video data is stored back in the mass storage device, space is available in the mass storage device to store the recently received video data. The degraded video data is continued to be degraded by removing pixels as new video data is received until the point in which the degraded video data becomes unusable. At that point, the degraded video data is removed from the mass storage device and the new video data received is stored directly in the mass storage device.

BRIEF DESCRIPTION OF THE DRAWINGS

A better understanding of the present invention can be obtained when the following detailed description of one exemplary embodiment is considered in conjunction with the following drawings, in which:

FIGS. 7A, 7B, 7C and 7D show are flow diagrams of the method of storing video data.

DETAILED OF DESCRIPTION OF DETAILED EMBODIMENTS

Figure 1:
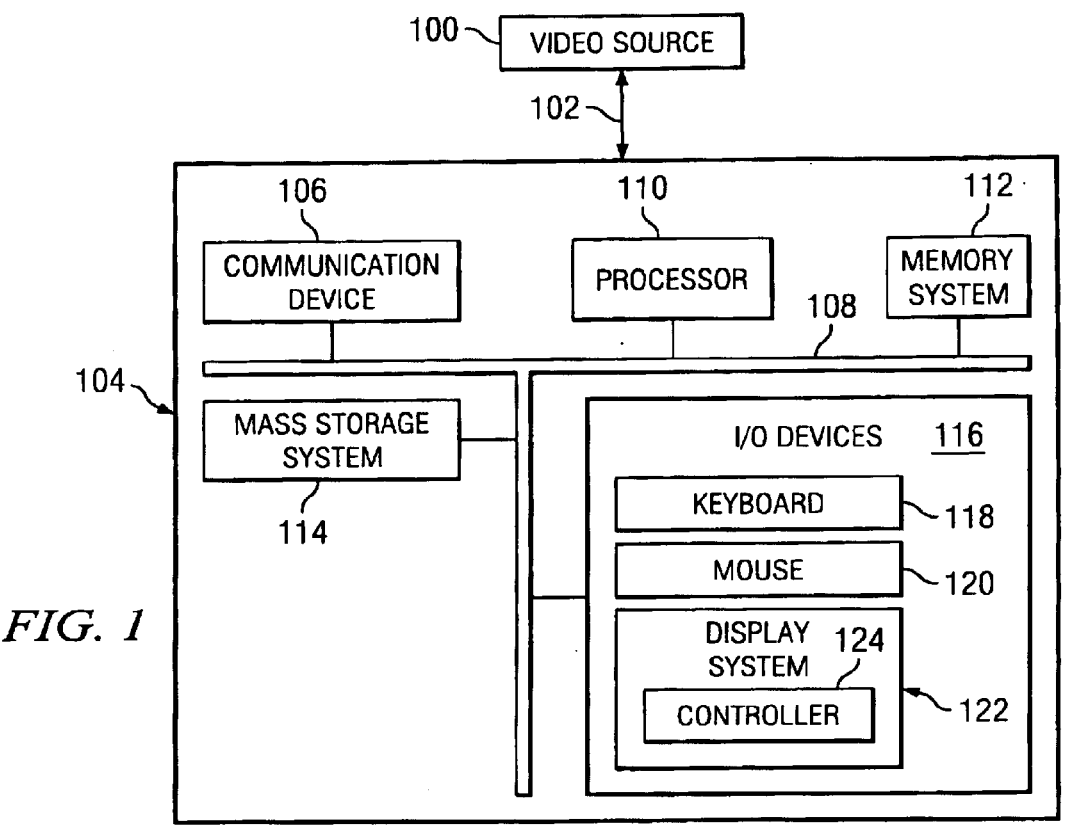
FIG. 1 is a block diagram depicting the computer system according to the invention.

In the description which follows, like parts are marked throughout the specification and drawings with the same reference numerals, respectively. The drawing figures are not necessarily drawn to scale and certain figures may be shown in exaggerated or generalized form in the interest of clarity and conciseness.

FIG. 1 illustrates the block diagram of the computer system according to the present invention. A video source 100 is shown connected to a computer system 104 via a communication line 102. The video source 100 provides digital video data to the computer system 104 in frames. The computer system 104 includes a communication device 106, a processor 110, a memory system 112, a mass storage system 114, a I/O device 116 which includes a keyboard 118 and a mouse 120, and a display system 122 including a display system controller 124, all connected via bus 108. The video source 100 may include a video camera which is providing live digital video to the computer system 104, a video player which is providing digital video previously recorded, or a separate computer system which has previously stored video data.

The communication device 106 includes a network communication device which allows for the computer system to be connected to the video source 100 via a network connection 102 and an Internet communication device which allows the computer system 104 to be connected to the video source 100 via any Internet connection including standard phone lines or direct connection. Further, the communication device 106 may include a device which allows for the video data to be input directly into the computer system 104. The processor 110 includes processors commonly available from major manufacturers. The memory system 112 includes random access memory (RAM) and read-only memory (ROM). The memory system must be of sufficient capacity to allow for the storage of video data during the degradation process. In one disclosed embodiment, 128 MB of RAM are provided. The bus 108 is of the type commonly available to those skilled in the art of computer system development. The mass storage system 114 includes a hard disk drive, an optical disk, a read/write CD drive, or a tape drive. Various other mass storage systems may be implemented without detracting from the spirit of the invention. The mass storage system 114 must be a sufficient size to allow for the storage of the video data. In one embodiment, 100 GB of storage capacity is provided. The I/O device 116 allows for the input and output of data to the computer system 104. The keyboard 118 and the mouse 120 are those commonly available from major manufacturers. The display system 122 includes a display controller 124. The display system includes a monitor or other projection devices which are controlled by the display system controller 124 which may include a graphics video card. Software is resident in the memory system 112 or the mass storage system 114. The software, when executed, stores and modifies the video data and is disclosed in more detail herein.

Figure 2:
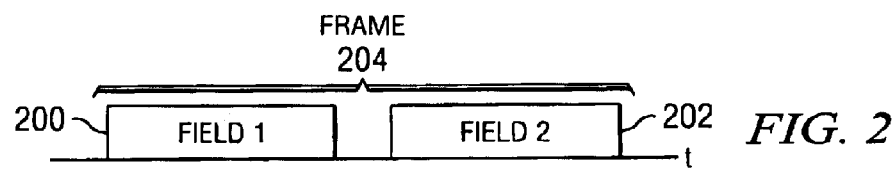
FIG. 2 is a timing diagram of the fields present in a frame.

FIG. 2 is a timing diagram of a frame. Field 1 200 and Field 2 202 are shown as frame 204, over a period of time. In one embodiment, Field 1 200 contains the even horizontal lines of the frame and Field 2 202 contains the horizontal odd lines of the frame. When the data contained in Field 1 200 and Field 2 202 are displayed, the entire frame 204 is viewable.

Figure 3:
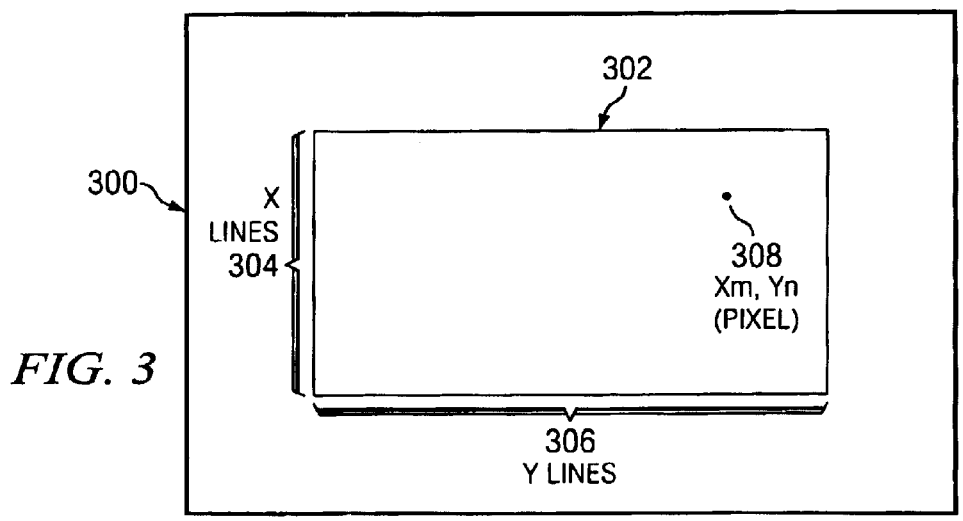
FIG. 3 is a diagram depicting a monitor screen identifying the horizontal and vertical lines.

Next in FIG. 3, the viewable screen of a computer monitor is shown. A monitor 300 is shown including a screen 302. The screen is comprised of X lines 304 where X is the number of horizontal lines available. In one embodiment, X lines 304 can include 480 lines. The computer screen 302 is shown with Y vertical lines 306 available. The Y lines 306 in one embodiment can include 640 lines. Each intersection of an X line 304 and a Y line 306 is called a pixel or picture element. Pixel Xm, Yn 308 is shown on computer screen 302. The amount of data necessary to uniquely identify each pixel varies according to the number of colors to be displayed and the resolution of the monitor. In one embodiment, and as will be used throughout this description for the present invention, the amount of data necessary to describe one pixel will be one byte.

Figure 4:
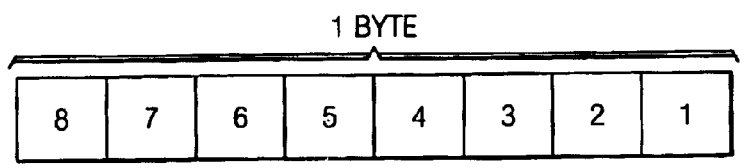
FIG. 4 is a diagram depicting I byte of data.

FIG. 4 shows a diagram depicting the number of bits in one byte 400. The size of the pixel may be up to 32 bits per pixel (8 bits each of red, green, blue and alpha components) however; such variations in the amount or size of data necessary to describe each pixel may vary without detracting from the spirit of the invention.

Figure 5:
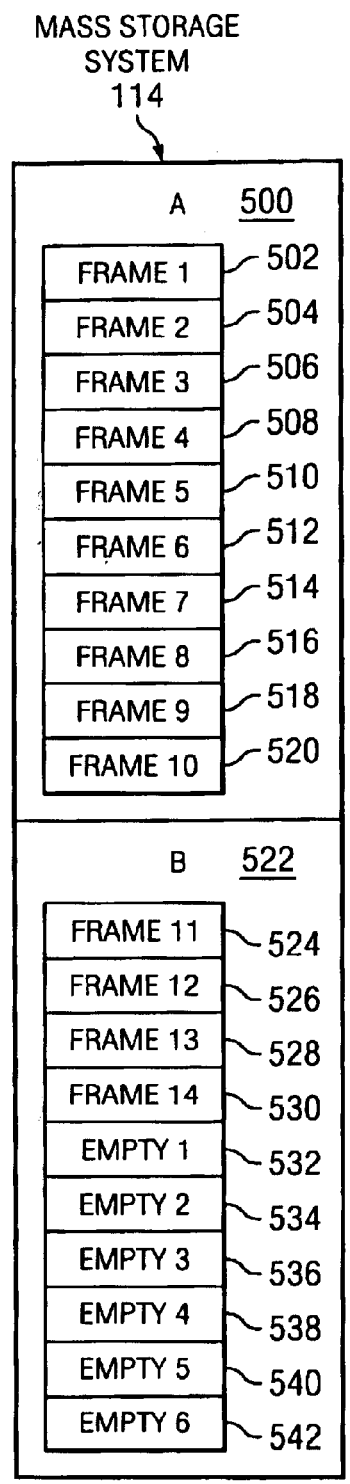
FIG. 5 is a block diagram of the mass storage device having storage capacity.

Next in FIG. 5 a block diagram of the mass storage system 114 according to the present invention is shown. Mass storage device 114 is shown partitioned into two areas, A 500 and B 522. The number of partitions available in mass storage system 114 may vary without detracting from the spirit of the invention. For this disclosure, two partitions are shown. The partitions A 500 and B 522 are defined upon initialization of the computer system 104. As video data is received in the form of frames from the video source 100, the computer system 104 stores these frames in the mass storage system 114. The first frame received, Frame 1 502 is stored in partition A 500. As each frame is received from the video source 100, the computer system continues to store the frames in the mass storage system, 114 as long as the mass storage system 114 has the capacity. Thus as is shown in FIG. 5, Frame 2 504, Frame 3 506, Frame 4 508, Frame 5 510, Frame 6 512, Frame 7 514, Frame 8 516, Frame 9 518, and Frame 10 520 are all shown stored in partition A 500. Once all capacity of partition A has been utilized, the computer system 104 begins to store the video frames in partition B 522. As can be seen, Frame 11 524, Frame 12 526, Frame 13 528 and Frame 14 530 are shown stored in the mass storage system 114 in partition B 522. However, the mass storage system 114 still has capacity in this example and is designated as Empty 1 532, Empty 2 534, Empty 3 536, Empty 4 538, Empty 5 540 and Empty 6 542. Therefore, in this example, the capacity of the mass storage system 114 still allows for the storage of six frames before any degradation process is necessary.

Figure 6A:
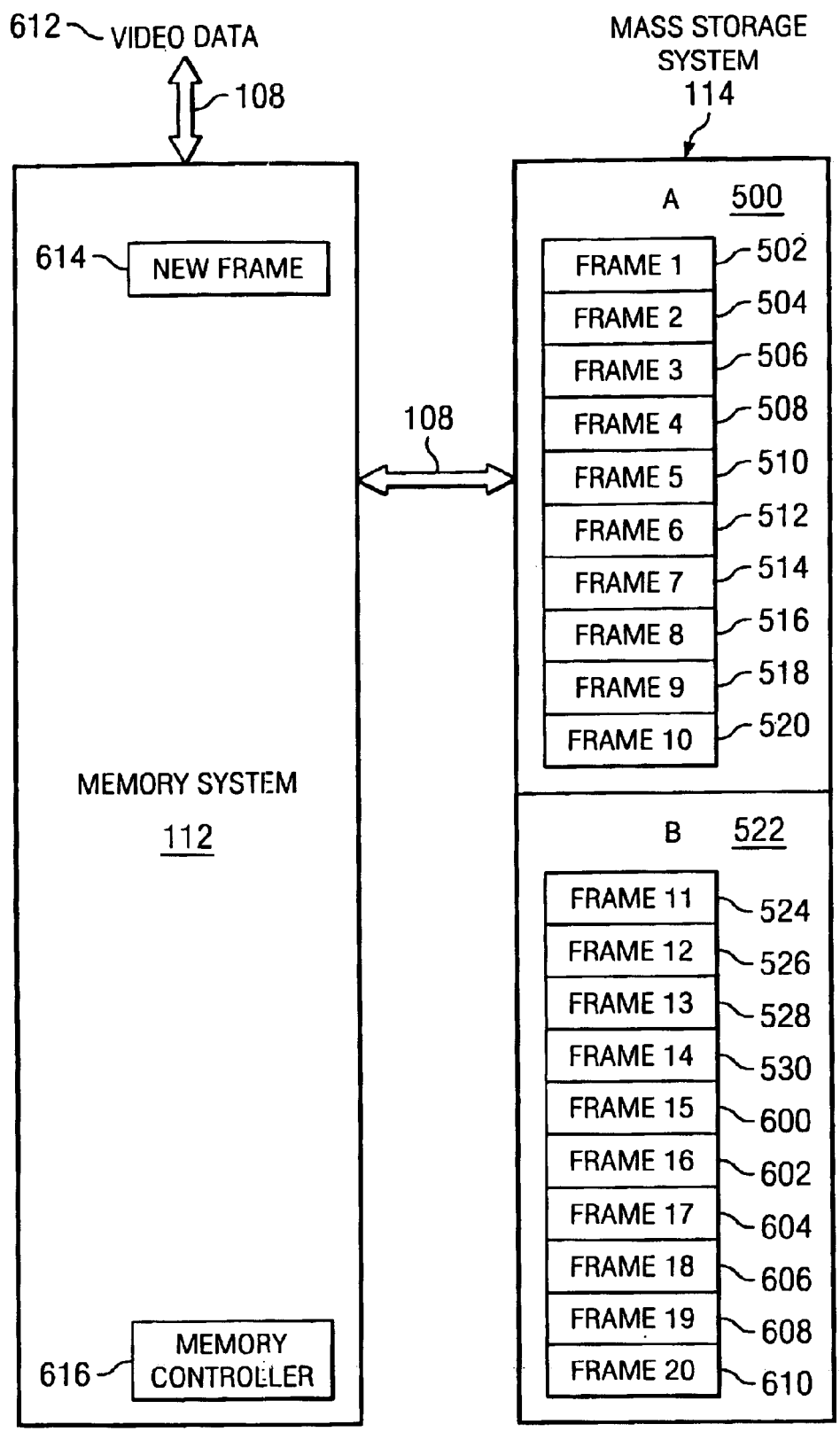
FIGS. 6A, 6B, 6C, and 6D show the movement and degradation of data in the mass storage device and memory.

Referring now to FIGS. 6A–D, the mass storage system 114 and memory system 112 utilization is shown during the degradation method according to the present invention. In FIG. 6A, the mass storage system 114 is shown with partition A 500 and partition B 522. Partition A 500 includes Frames 1 502 through Frames 10 520. Partition B 522 includes Frames 11 524 through Frame 14 530, as was shown previously is FIG. 5, however, Frames 15 600, Frame 16 602, Frame 17 604, Frame 18 606, Frame 19 608, Frame 20 610 are shown stored in 114 partition 522. As can be seen in this example, the capacity of the mass storage system 114 is zero. Therefore, to store a new frame in the mass storage system 114 requires that the presently stored frames be degraded. This degradation allows the frames to occupy less space in the mass storage system 114 and allows storage of the new frame. The mass storage system 114 is connected to the memory 112 via bus 108. Video data 612 is received in the computer system 104 and is stored in the memory system 112. The memory system 112 includes a new frame 614 which is awaiting storage in the mass storage system 114. The memory system 112 includes a memory controller 616 which controls the input/output and the allocation of the memory available in the memory system 112.

Figure 6B:
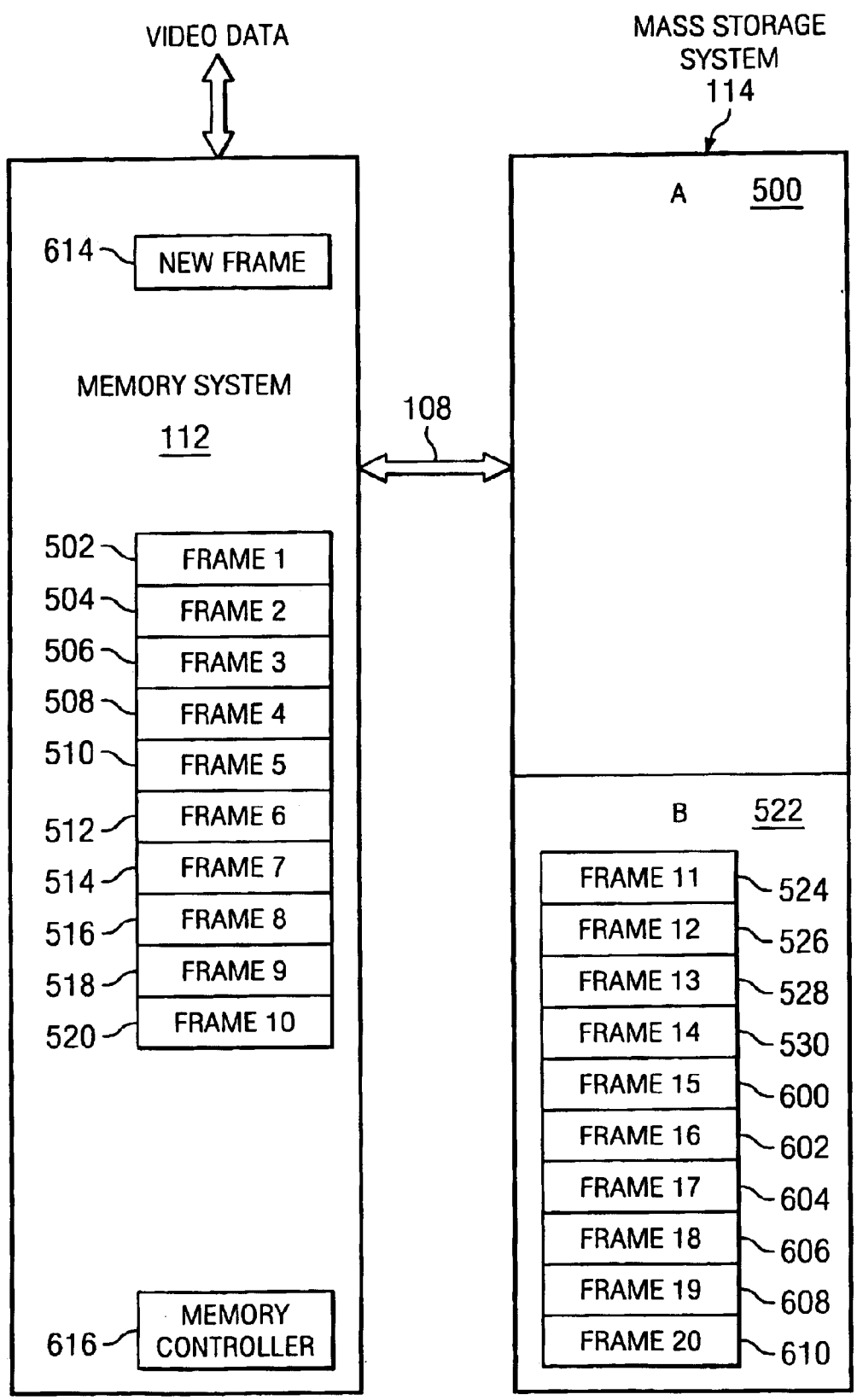

Referring now to FIG. 6B, the mass storage system 114 and memory system 112 are shown after the video data has been removed from the mass storage system 114. As can be seen, partition A 500 has no data stored in the mass storage system 114. The video data stored in partition B 522 remains unchanged. Frames 1 502 through Frame 10 520 have been removed from the mass storage system 114 and have been stored in the memory system 112. In one embodiment, the entire video data is removed from a partition and stored in the memory system 112. However, varying amounts of video data may be removed, including only a portion of the video data stored in a partition, without detracting from the spirit of the invention.

Figure 6C:
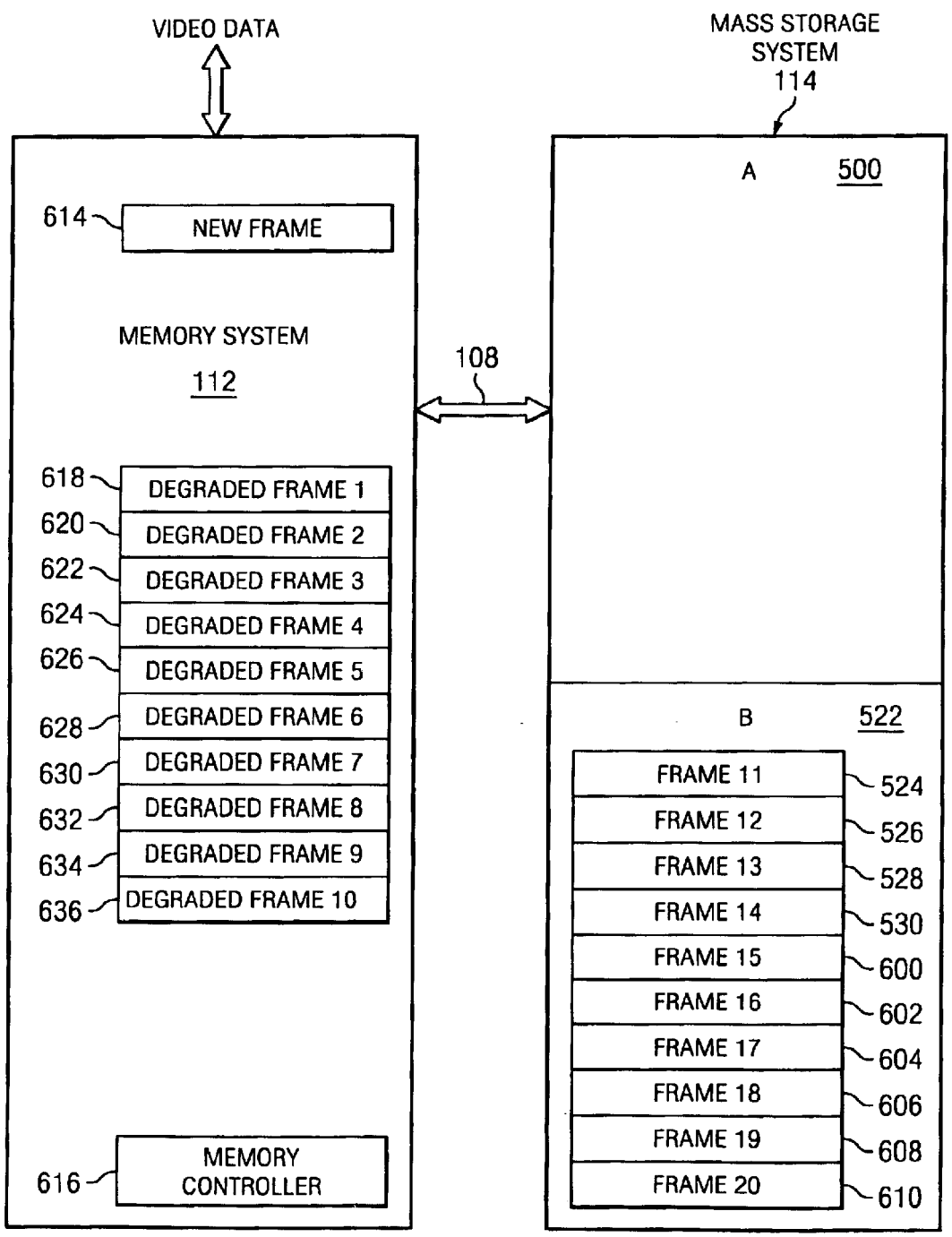

Referring now to FIG. 6C, the mass storage system 114 and memory system 112 are shown after the video data has been degraded. Partition A 500 remains unused while partition B 522 still stores Frame 11 524 through Frame 20 610. In the memory system 112, Frame 1 502 through Frame 10 520 have been replaced with Degraded Frame 1 618, Degraded Frame 2 620, Degraded Frame 3 622, Degraded Frame 4 624, Degraded Frame 5 626, Degraded Frame 6 628, Degraded Frame 7 630, Degraded Frame 8 632, Degraded Frame 9 634 and Degraded Frame 10 636. The memory utilized to store Degraded Frame 1 618 through Degraded Frame 10 636 is less than the memory necessary to store Frame 1 502 through Frame 10 520. In one embodiment, the amount of memory that is saved after the degradation process is equivalent to the size of new Frame 614. However, the amount of memory saved through the degradation process may be greater than the size of the new Frame 614, allowing multiple new frames to be stored before a second iteration of the degradation processes, without detracting from the spirit of the invention. Once the video data has been degraded, Degraded Frames 1 618 through Degraded Frame 10 636 and the new frame 614 are ready to be restored in the mass storage system 114.

Figure 6D:
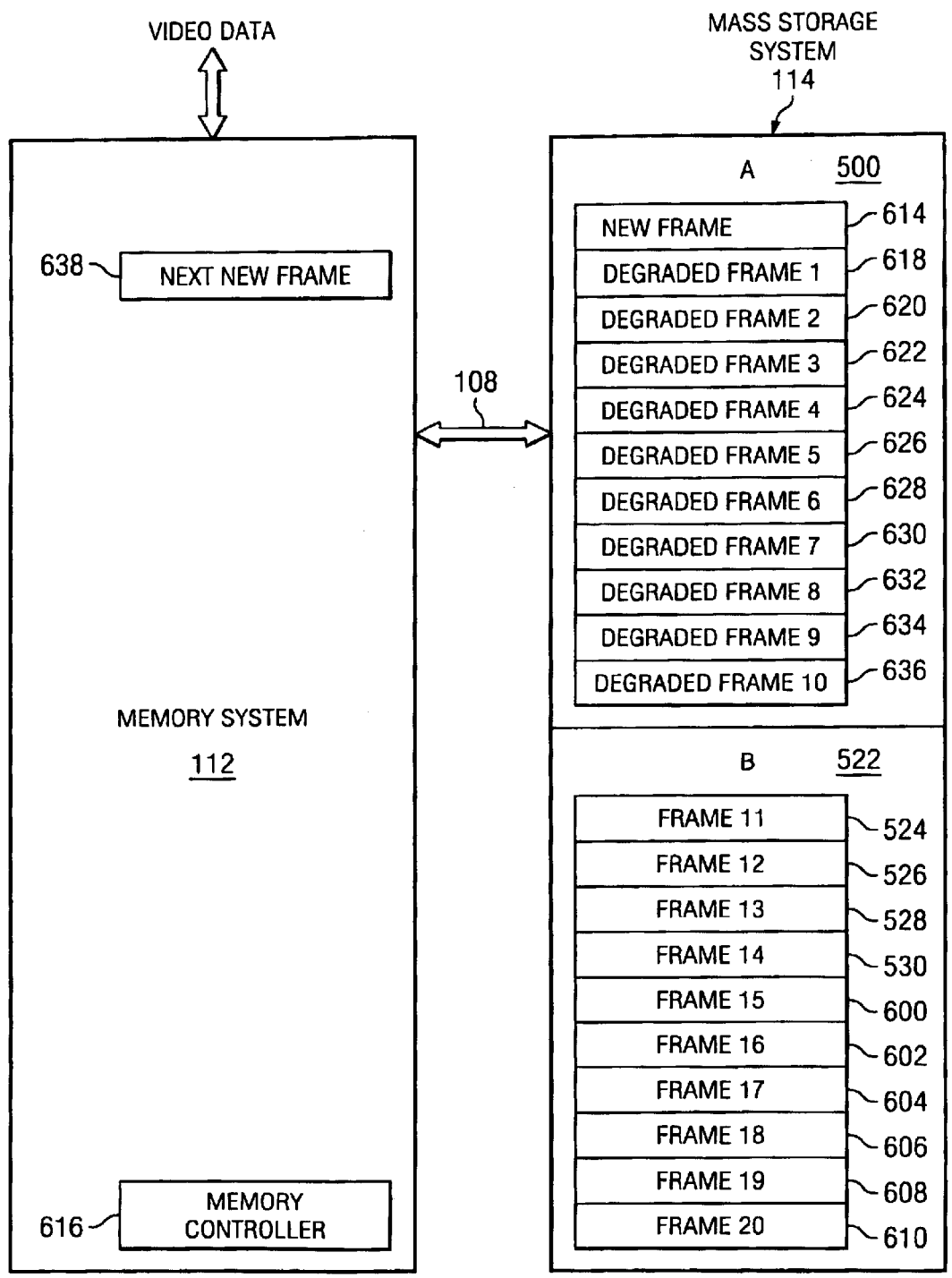

Referring to FIG. 6D, the mass storage system 114 and the memory system 112 are shown after the Degraded Frames 1618 through Degraded Frame 10 636 and the new frame 614 are stored in the mass storage system 114. In the mass storage system 114, partition A 500 includes new frame 614 and Degraded Frames 1 618 through Degraded Frame 10 636. The video data stored in partition B 522 remains unchanged as Frames 11 524 through Frame 20 610 are the recently received video data and therefore remain non-degraded. The memory system 112 now includes a next new Frame 638. As the capacity of the mass storage system 114 is again zero, the process of degradation must begin again before the next new Frame 638 may be stored in partition A 500 of the memory of the mass storage system 114. Degraded Frames 1 618 through Degraded Frame 10 636 will again be removed from partition A, however new Frame 614 will remain in partition A 500. The Degraded Frames 1618 through Degraded Frame 10 636 will again be degraded to allow for the storage of the next new frame 638 and the degraded frames in partition A 500. This process will continue until the degradation of the frames is such that the video data becomes unusable. In one embodiment, the degraded video data becomes unusable when thirty percent of the pixels have been removed. However, varying the amount of pixel removed to determine when the degraded video data becomes unusable may vary without detracting from the spirit of the invention. Once the degraded video data is determined to be unusable and no further degradation can be done, then the degraded video data is removed from the mass storage system 114 and the next new frames are stored in partition A. The video data received in frames at that point will be stored in the mass storage system 114 until the capacity of the mass storage system 114 is zero. Once the capacity is zero, then partition B 522 and Frames 11 524 through Frame 20 610 will begin the degradation process allowing new Frame 614 and next new Frame 638 plus the remaining new frames stored in partition A to remain intact.

Figure 7C:
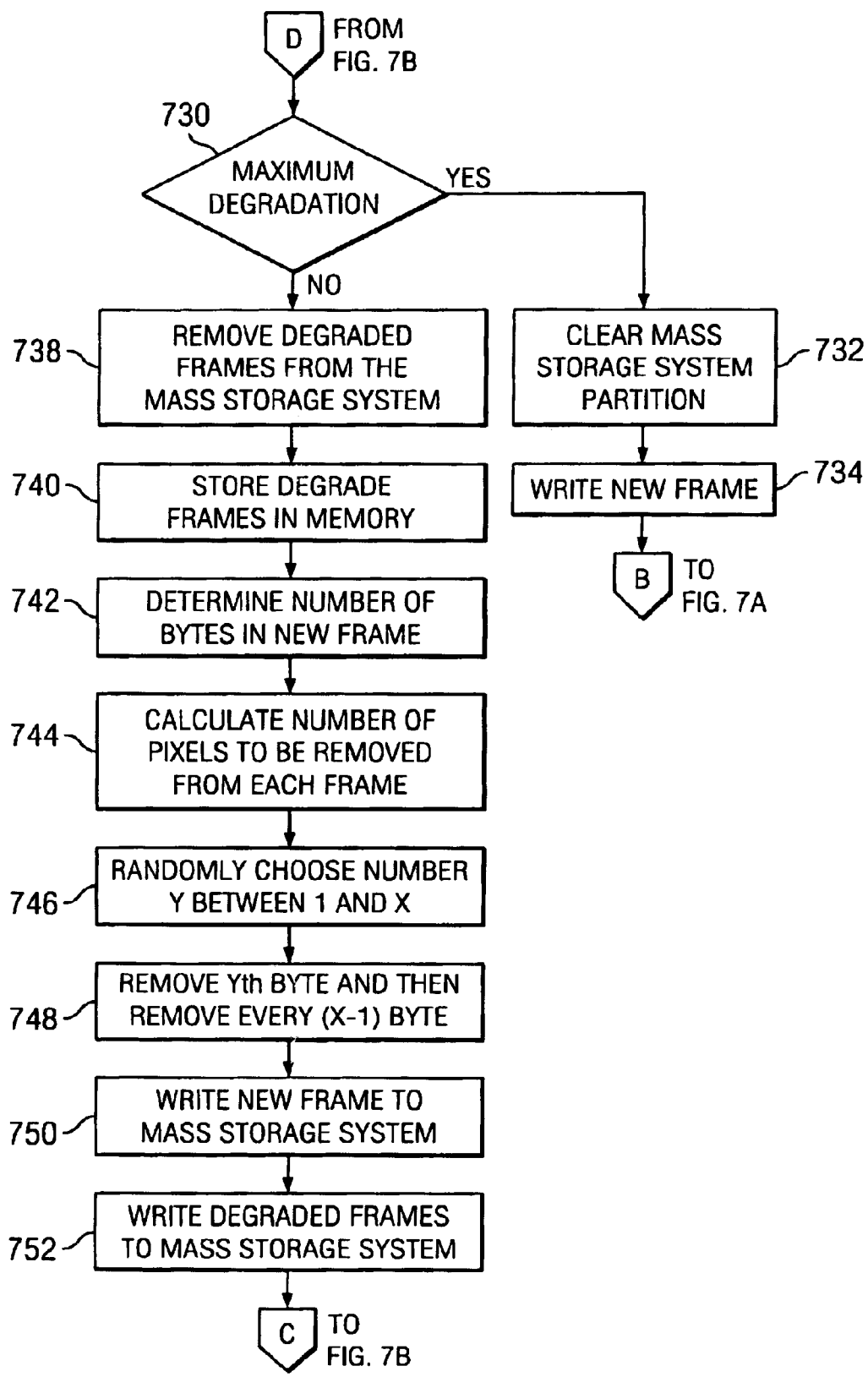

Referring now to FIGS. 7A–C, a flow chart depicting the method of storing video data is shown. The process begins with Start 700. Next in step 704, the degradation program is initiated. The degradation program can be initiated manually by a user or can initiate during the start-up of the computer system 104. Once the degradation program has been initiated, the mass storage system memory 114 is partitioned. The number of partitions of the mass storage memory can be selected manually by a user or the number of partitions can be included in the degradation program code so that the partitioning is done upon the degradation program initialization. For purposes of this example, the partitioning of the mass storage system 114 memory is shown as 2, however, multiple numbers of partitions may be implemented without detracting from the spirit of the invention. In step 706, video data in the form of a video frame is received. Next in step 708, the capacity available in the mass storage system 114 is determined. If the capacity of the mass storage system 114 is not zero. The video frame is stored in step 710. After the video frame is stored, the method awaits the next video frame to be received. If the mass storage system capacity is zero, then the oldest stored frames in the memory storage system 114 are identified in step 712. Next in step 714, the oldest video frames are removed from the mass storage system 114. In one embodiment, all video frames in a partition are removed from the mass storage system 114. However, a portion or a subset of the frames may be removed from a partition without detracting from the spirit of the invention. Next is step 716, the removed video frames are stored in the memory system 112. The determination of the number of bytes in the video frame received in step 706 is determined in step 718. The requirement to determine the number of bytes in the video frame received is necessary as video data may be received of varying resolution and/or varying number of colors. Next in step 720, the number of pixels to be removed from each of the frames previously stored in the mass storage system 114 is calculated. This is done by dividing the number of bytes in the new frame received by the number of frames that were removed from the mass storage system. Once the number of pixels to be removed has been determined, that value is divided by the number of pixels in a frame which was removed from the mass storage system 114 to determine the repeating value in step 721. Once the repeating value has been calculated, then every X byte is removed from the removed video data where X equals the repeating value in Step 722. For example, if the repeating value is ten, then every tenth byte is removed from the video data stored in the memory system that was removed from the mass storage system 114. Next in step 724, the new frame is written to the mass storage system. The new frame is written as the first entry into the open or unused portion of the mass storage system 114. Next in step 726, the degraded frames are written to the mass storage system in the remaining unused memory. In one embodiment, the amount of data removed from the stored, video data is equivalent to the size in bytes of the new frame. However, an amount of memory greater than of that required by the new frame may be removed without detracting from the spirit of the invention. If an amount greater than that necessary for the new frame is removed, then the next received video frames are stored in the unused mass storage system 114 until the mass storage system 114 capacity is again zero. Alter the degraded frames are written to the mass storage system, the next video frame is received in step 728. Next in step 729, a determination is made regarding the amount of degradation that has occurred on the degraded frames stored in the mass storage system 114. Next in step 730, determination is made if the degradation amount is the maximum allowed. If the maximum degradation amount has been reached, the degraded video data stored in the mass storage system 114 is removed in step 732. Next in step 734, the new recently received frame is stored in the mass storage subsystem in step 734. Next, the method returns to step 706 to receive the next video frame. If the degradation amount is not the maximum allowed, the degraded frames are removed from the mass storage system 114 in step 738. Next, in step 740, the degraded frames are stored in memory system 114 in step 740. The determination of the number of bytes in the new frame is made in step 742. The calculation of the number of pixels to be removed from each frame is made is step 744. Next, in step 746 a number between one and Z where Z is the number of bytes remaining in each degraded frame is selected. Next, in step 748 the Zth byte is then removed and then every (X-1) byte is removed where X again is the number of bytes remaining in each frame that has been degraded. Next in step 750, the new frame is stored next to the previous new frame 114. In step 752, the degraded frames are stored in the mass storage system. The method then runs to step 728 for the reception of the next video frame. The process will continue until the program has been stopped.

The foregoing disclosure and description of the invention are illustrative and explanatory thereof and various changes to the size, shape, materials, components, and order may be made without departing from the spirit of the invention.

What is claimed is:

1. A method of storing video data in a memory, the method comprising the steps of:
   receiving video data from a video source;
   evaluating memory capacity available;
   if memory capacity available is sufficient, storing video data in the memory;
   if memory capacity available is insufficient, performing the following steps:
      locating previously stored video data in the memory;
      reading previously stored video data out of the memory;
      modifying previously stored video data, wherein the modified previously stored video data requires less space in memory,
      rewriting modified previously stored video data to the memory,
   writing the received video data to the memory.

2. The method of claim 1, wherein the step of locating previously stored video data in the memory includes locating the oldest previously stored video data in the memory.

3. The method of claim 1, wherein the step of receiving video data includes receiving video data in frames.

4. The method of claim 3, wherein the step of receiving video data in frames includes receiving pixel data.

5. The method of claim 4, wherein the step of receiving video data includes receiving one byte of data for each pixel data in the frame.

6. The method of claim 5, wherein the step of receiving video data in frames includes receiving at least 307000 bytes per frame.

7. The method of claim 6 wherein the step of reading previously stored video data out of the memory includes reading frames out of the memory.

8. The method of claim 7 wherein the step of modifying previously stored video data includes removing pixels from the frames.

9. The method of claim 7 wherein the step of modifying previously stored video data includes removing pixels from the frames in an amount equal to the number of pixels in the received video data.

10. The method of claim 1, wherein the step of evaluating memory capacity includes determining amount of unused memory.

11. The method of claim 1 wherein the step of locating previously stored video data in the memory includes locating modified previously stored data.

12. The method of claim 1 wherein the step of locating previously stored data includes locating previously stored data based upon an aging protocol.

13. The method of claim 12 wherein the aging protocol includes the steps of:
   determining amount of degradation acceptable before removing modified previously stored video data from memory;
   determining amount of the memory to be allocated for modified previously stored video data;
   partitioning memory according to the allocation;
   determining amount of degradation of modified previously stored video data in partitioned memory;
   if amount of degradation is acceptable, identifying modified previously stored to video data; and
   if amount of degradation is unacceptable, removing modified previously stored video data from the memory.

14. The method of claim 13 wherein the step of determining amount of degradation acceptable includes determining the amount based upon a predetermined coefficient.

15. A system for storing video data in a memory, the system comprising:
   a video source; and
   a video storage system coupled to the video source; the video storage system comprising:
      a processor;
      a memory coupled to the processor;
      a mass storage device coupled to the processor
      video storage software resident in the memory, the video storage software, when executed, performing the steps of:
         receiving video data from the video source;
         evaluating capacity available of the mass storage device;
         if capacity available of the mass storage device is sufficient, storing video data in the memory;
         if capacity available of the mass storage device is insufficient, performing the following steps:
            locating previously stored video data in the mass storage device;
            reading previously stored video data out of the mass storage device in to the memory;
            modifying previously stored video data in memory, wherein the modified previously stored video data requires less space in the mass storage device;
            rewriting the modified previously stored video data to the mass storage device,
            writing the received video data to the mass storage device.

* * * * *